US012624816B2

(12) United States Patent
Ano

(10) Patent No.: US 12,624,816 B2
(45) Date of Patent: May 12, 2026

(54) LIGHT SOURCE UNIT FOR VEHICULAR LIGHTING FIXTURE, AND VEHICULAR LIGHTING FIXTURE

(71) Applicant: Stanley Electric Co., Ltd., Tokyo (JP)

(72) Inventor: Koichiro Ano, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/845,340

(22) PCT Filed: Mar. 7, 2023

(86) PCT No.: PCT/JP2023/008519
§ 371 (c)(1),
(2) Date: Sep. 9, 2024

(87) PCT Pub. No.: WO2023/176582
PCT Pub. Date: Sep. 21, 2023

(65) Prior Publication Data
US 2025/0189097 A1 Jun. 12, 2025

(30) Foreign Application Priority Data
Mar. 14, 2022 (JP) ................................ 2022-039641

(51) Int. Cl.
*F21S 43/20* (2018.01)
*F21S 43/14* (2018.01)
(Continued)

(52) U.S. Cl.
CPC ............ *F21S 43/255* (2018.01); *F21S 43/14* (2018.01); *F21S 43/195* (2018.01); (Continued)

(58) Field of Classification Search
CPC ......... F21S 43/14–195; F21S 43/20–27; F21S 45/40–48; F21W 2103/60; F21Y 2115/10
See application file for complete search history.

(56) References Cited

U.S. PATENT DOCUMENTS 6,715,900 B2 * 4/2004 Zhang .................. F21V 29/773
362/800
7,237,936 B1 * 7/2007 Gibson .................. F21S 45/33
362/547
(Continued)

FOREIGN PATENT DOCUMENTS

CN 109945124 A 6/2019
DE 102020211149 A1 7/2021
(Continued)

OTHER PUBLICATIONS

International Search Report for PCT/JP2023/008519 dated May 9, 2023.
(Continued)

*Primary Examiner* — Jason M Han
(74) *Attorney, Agent, or Firm* — Kenealy Vaidya LLP

(57) ABSTRACT

A light source unit for a vehicular lighting fixture includes a plurality of light sources, a plurality of lens bodies disposed in front of the plurality of light sources, respectively, a circuit board on which the plurality of light source are mounted, a heatsink configured to radiate heat emitted from the plurality of light sources to outside via a board attachment part to which the circuit board is attached, and a socket body configured integrally with the heatsink and having a connector part electrically connected to the circuit board, and drawing patterns formed by emission of the plurality of light sources are projected toward a road surface by the plurality of lens bodies.

8 Claims, 6 Drawing Sheets

(51) Int. Cl.

| | |
|---|---|
| ***F21S 43/19*** | (2018.01) |
| ***F21S 43/27*** | (2018.01) |
| ***F21S 45/48*** | (2018.01) |
| ***F21W 103/60*** | (2018.01) |
| ***F21Y 115/10*** | (2016.01) |

(52) U.S. Cl.

CPC ......... *F21S 43/26231* (2024.05); *F21S 43/27* (2018.01); *F21S 45/48* (2018.01); *F21W 2103/60* (2018.01); *F21Y 2115/10* (2016.08)

(56) References Cited

U.S. PATENT DOCUMENTS

| | | | |
|---|---|---|---|
| 10,928,029 | B1 | 2/2021 | Woo et al. |
| 2016/0290587 | A1 | 10/2016 | Nakagawa et al. |
| 2023/0041578 | A1 | 2/2023 | Hamamoto et al. |

FOREIGN PATENT DOCUMENTS

| | | | |
|---|---|---|---|
| JP | 2015-069709 | A | 4/2015 |
| JP | 2019-021588 | A | 2/2019 |
| JP | 2019-084915 | A | 6/2019 |
| JP | 2020-102332 | A | 7/2020 |
| JP | 2021-111465 | A | 8/2021 |
| WO | 2021/172134 | A1 | 9/2021 |
| WO | 2022/019231 | A1 | 1/2022 |

OTHER PUBLICATIONS

Extended European Search Report for the related European Patent Application No. 23770538.9 dated Sep. 8, 2025.

* cited by examiner

LIGHT SOURCE UNIT FOR VEHICULAR LIGHTING FIXTURE, AND VEHICULAR LIGHTING FIXTURE

This application is a U.S. National Stage Application under 35 U.S.C. § 371 of International Patent Application No. PCT/JP2023/008519 filed Mar. 7, 2023, which claims the benefit of priority under 35 U.S.C. § 119 to Japanese Patent Application No. 2022-039641 filed Mar. 14, 2022, the disclosures of all of which are hereby incorporated by reference in their entireties.

TECHNICAL FIELD

The present invention relates to a light source unit for a vehicular lighting fixture, and a vehicular lighting fixture.

BACKGROUND ART

In vehicular lighting fixtures in recent years, as light emitting diodes (LEDs) have become more highly luminous and less costly, the number of configurations that use light emitting elements such as LEDs as light sources has been gradually increasing. LEDs have the merits of long life and low power consumption. Meanwhile, since high temperatures lead to a decrease in light emitting efficiency and reduction in lifespan, it is necessary to use a heat sink to efficiently dissipate the heat generated by LEDs to the outside.

For example, the following Patent Document 1 discloses a light source unit in which a circuit board on which an LED and a driving circuit configured to drive the LED are mounted is attached to a heatsink, and a coupler socket integrally attached to a connector part that electrically connects the heatsink to the circuit board is detachably attached to an attachment hole provided in a lighting body on a back surface side.

Citation List

Patent Document

Patent Document 1: Japanese Unexamined Patent Application, First Publication No. 2021-111465

SUMMARY OF INVENTION

Technical Problem to be Solved by Invention

Incidentally, in the vehicular lighting fixture disclosed in Patent Document 1 as described above, in order to improve safety when driving, road surface drawing is performed by projecting light onto a road surface. Specifically, in the vehicular lighting fixture disclosed in Patent Document 1, by using a light blocking member having a slit through which light condensed by a condensing lens partially passes, a drawing pattern obtained by reflecting a shape of the slit is projected onto the road surface using a projection lens.

However, in the vehicular lighting fixture disclosed in Patent Document 1 as described above, there is a need to separately provide a housing that accommodates the condensing lens, the light blocking member and the projection lens in front of a coupler socket, which increases the number of parts and makes the lighting body larger. In addition, since light other than the light passing through the slit is blocked by the light blocking member, utilization efficiency of the light deteriorates.

An aspect of the present invention is directed to providing a light source unit for a vehicular lighting fixture capable of increasing utilization efficiency of light when road surface drawing is performed, and a vehicular lighting fixture including such a light source unit for a vehicular lighting fixture.

Solution to Problem

An aspect of the present invention provides the following configurations.

(1) A light source unit for a vehicular lighting fixture including:

- a plurality of light sources;
- a plurality of lens bodies disposed in front of the plurality of light sources, respectively;
- a circuit board on which the plurality of light sources are mounted;
- a heatsink configured to radiate heat emitted from the plurality of light sources to outside via a board attachment part to which the circuit board is attached; and
- a socket body configured integrally with the heatsink and having a connector part electrically connected to the circuit board,
- wherein drawing patterns formed by emission of the plurality of light sources are projected toward a road surface by the plurality of lens bodies.

(2) The light source unit for a vehicular lighting fixture according to the above-mentioned (1), wherein the drawing patterns obtained by reflecting shapes formed by emission of the light sources are projected toward a road surface.

(3) The light source unit for a vehicular lighting fixture according to the above-mentioned (1), including a filter that is disposed between the light sources and the lens bodies and that has a transmissive area through which light emitted from the light sources passes,

- wherein a drawing pattern obtained by reflecting a shape of the transmissive area is projected toward a road surface.

(4) The light source unit for a vehicular lighting fixture according to any one of the above-mentioned (1) to (3), wherein the plurality of light sources are arranged in one direction in a surface of the circuit board,

- the plurality of lens bodies are disposed for each of the light sources aligned in the one direction, respectively, in a state distances between the light sources and the lens bodies are different from each other for each of the light sources, and
- drawing patterns formed by emission of the plurality of light sources are projected toward a road surface next to each other in a forward/rearward direction by the plurality of lens bodies.

(5) The light source unit for a vehicular lighting fixture according to the above-mentioned (4), wherein light gathering power of the plurality of lens bodies becomes relatively higher as the distance between the lens bodies and the light source becomes larger.

(6) The light source unit for a vehicular lighting fixture according to any one of the above-mentioned (1) to (5), including a lens holding part configured to hold the lens body in front of the light source while surrounding the light source.

(7) A vehicular lighting fixture including the light source unit for a vehicular lighting fixture according to any one of the above-mentioned (1) to (6).

Advantageous Effects of Invention

According to the aspect of the present invention, it is possible to provide a light source unit for a vehicular lighting fixture capable of increasing utilization efficiency of light when road surface drawing is performed, and a vehicular lighting fixture including such a light source unit for a vehicular lighting fixture.

DESCRIPTION OF EMBODIMENTS

Figure 1:
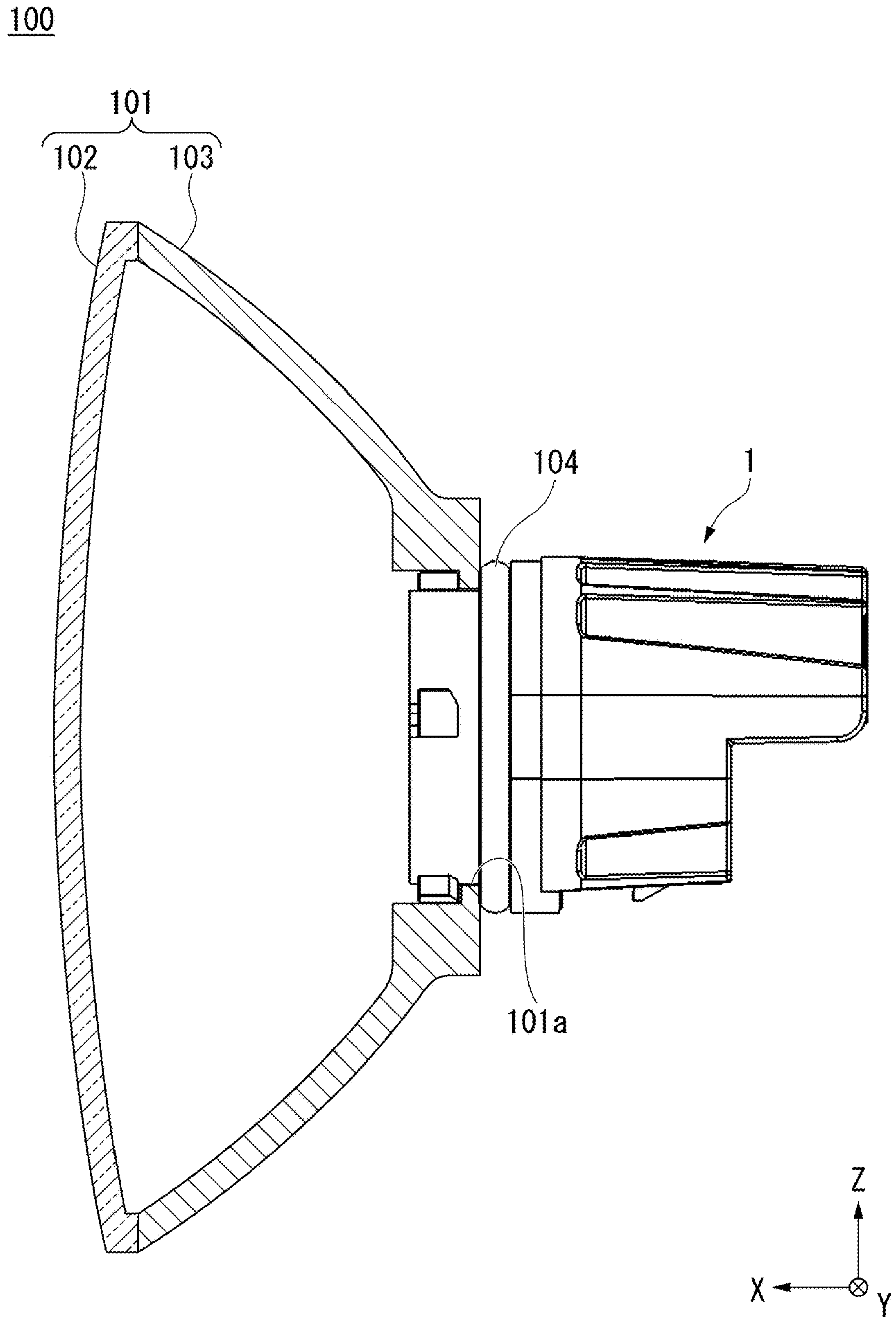
FIG. 1 is a cross-sectional view showing a configuration of a vehicular lighting fixture including a light source unit for a vehicular lighting fixture according to an embodiment of the present invention.

Hereinafter, an embodiment of the present invention will be described in detail with reference to the accompanying drawings.

Further, in the drawings used in the following description, in order to make each component easier to see, dimensions may be shown at different scales depending on the component, and a dimensional ratio of each component may not necessarily be the same as the actual one.

As the embodiment of the present invention, for example, a vehicular lighting fixture 100 including a light source unit for a vehicular lighting fixture (hereinafter referred to as “a light source unit”) 1 shown in FIG. 1 will be described.

Further, FIG. 1 is a cross-sectional view showing a configuration of the vehicular lighting fixture 100 including the light source unit 1.

In addition, in the drawings described below, an XYZ orthogonal coordinate system is set, an X-axis direction indicates a forward/rearward direction (a lengthwise direction) of the light source unit 1 (the vehicular lighting fixture 100), a Y-axis direction indicates a leftward/rightward direction (a widthwise direction) of the light source unit 1 (the vehicular lighting fixture 100), and a Z-axis direction indicates an upward/downward direction (a height direction) of the light source unit 1 (the vehicular lighting fixture 100).

The vehicular lighting fixture 100 of the embodiment includes, for example, the light source unit 1 configured to perform road surface drawing using light projected onto a road surface when a vehicle (not shown) moves rearward, as a part of back lamps mounted on both corner portions of the vehicle on the side of a rear end.

Further, in the following description, directions of “forward,” “rearward,” “leftward,” “rightward,” “upward” and “downward” are not particularly limited, and are directions when the vehicular lighting fixture 100 (the light source unit 1) is seen from a front side (behind the vehicle). Accordingly, directions when the vehicle is viewed from the front side (in front of the vehicle) are directions which are opposite to the above-mentioned forward, rearward, leftward and rightward directions.

Specifically, as shown in FIG. 1, the vehicular lighting fixture 100 has a configuration in which the light source unit 1 of the embodiment is accommodated in a lighting body 103 constituted by a housing 101, a front side (front surface) of which is opened, and a transparent lens cover 102 configured to cover the opening of the housing 101.

The light source unit 1 can be detachably attached to a periphery of the attachment hole 101*a* via a ring-shaped packing (O ring) 104 in a state in which a front surface side of the light source unit is inserted inside of the lighting body 103 from an attachment hole 101*a* provided in the housing 101 (the lighting body 103) on a back surface (rear surface) side, as an exchangeable (replaceable) coupler socket.

Hereinafter, a specific configuration of the light source unit 1 of the embodiment will be described with reference to FIG. 2 to FIG. 7.

Figure 2:
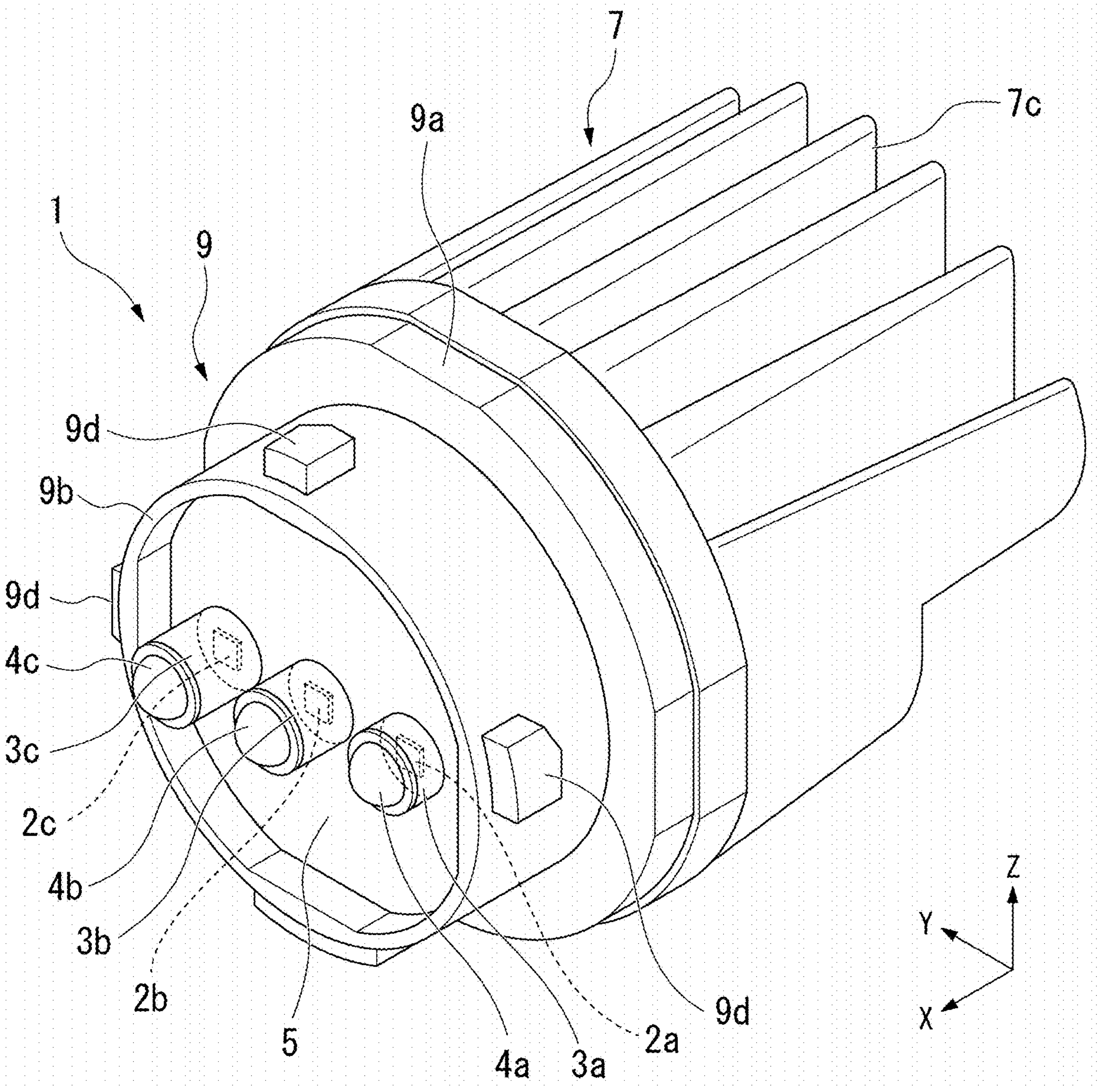
FIG. 2 is a perspective view showing a configuration of the light source unit for a vehicular lighting fixture shown in FIG. 1.
Figure 3:
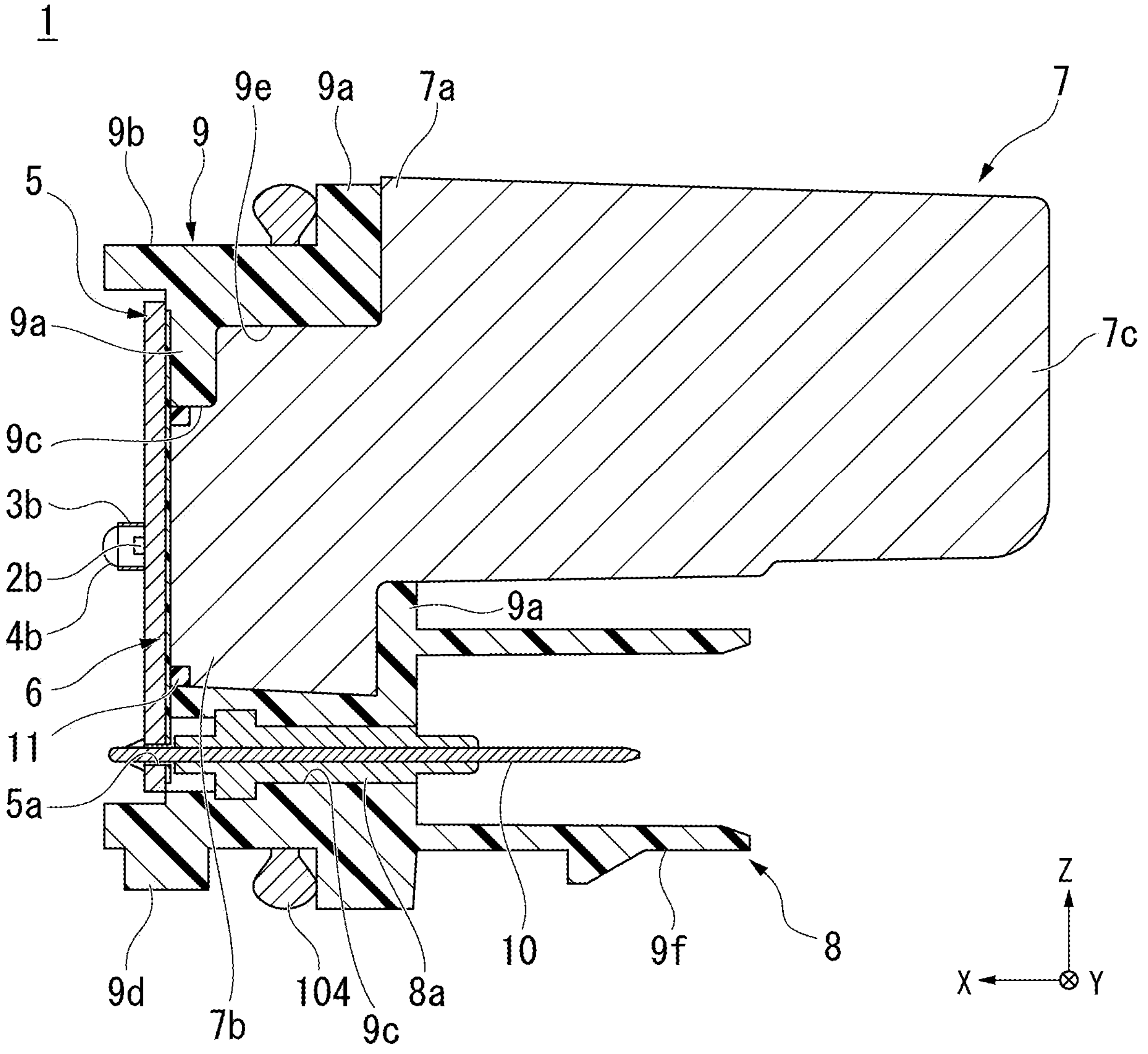
FIG. 3 is a cross-sectional view showing a configuration of the light source unit for a vehicular lighting fixture shown in FIG. 2.
Figure 4:
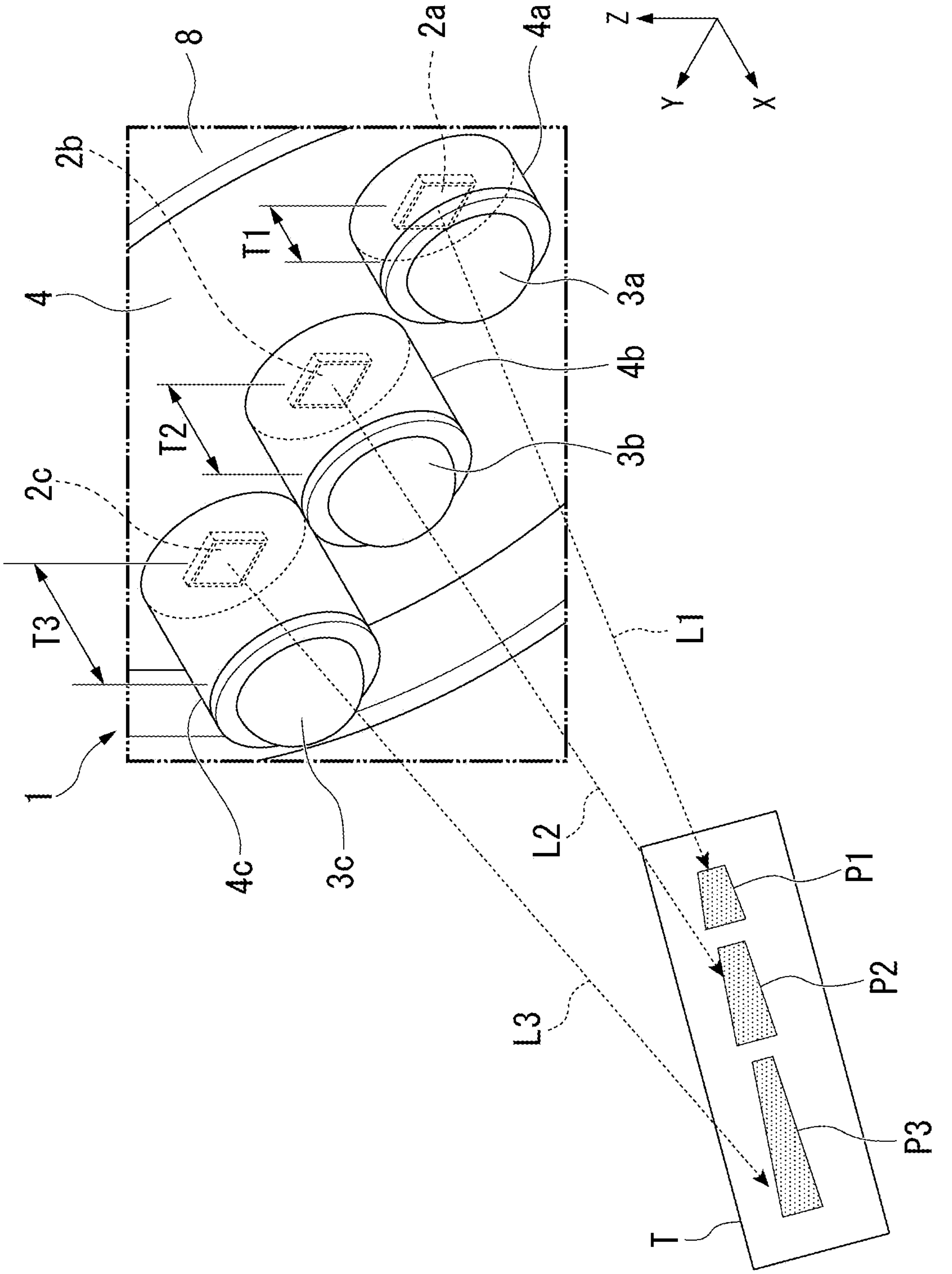
FIG. 4 is a perspective view showing a shape when a drawing pattern, which is obtained by reflecting a shape formed by emission of a plurality of light sources from the light source unit for a vehicular lighting fixture shown in FIG. 2, is projected onto a road surface using a plurality of lens bodies.
Figure 5:
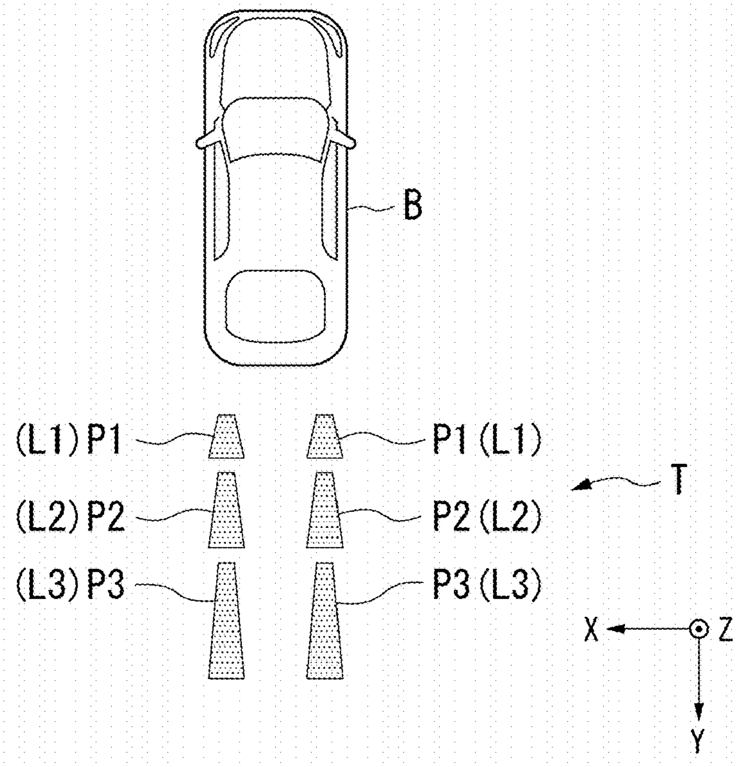
FIG. 5 is a plan view showing a shape when a drawing pattern obtained by reflecting a shape formed by emission of the plurality of light sources is projected onto a road surface using the plurality of lens bodies as a part of a back lamp from the light source unit for a vehicular lighting fixture shown in FIG. 2.
Figure 6:
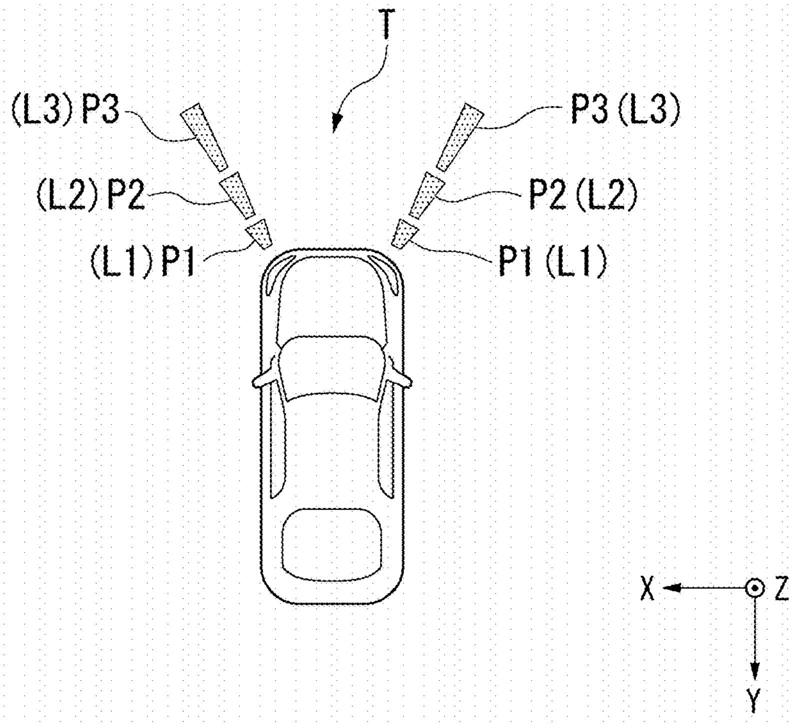
FIG. 6 is a plan view showing a shape when a drawing pattern obtained by reflecting a shape formed by emission of the plurality of light sources is projected onto a road surface using the plurality of lens bodies as a part of a turn lamp from the light source unit for a vehicular lighting fixture shown in FIG. 2.
Figure 7:
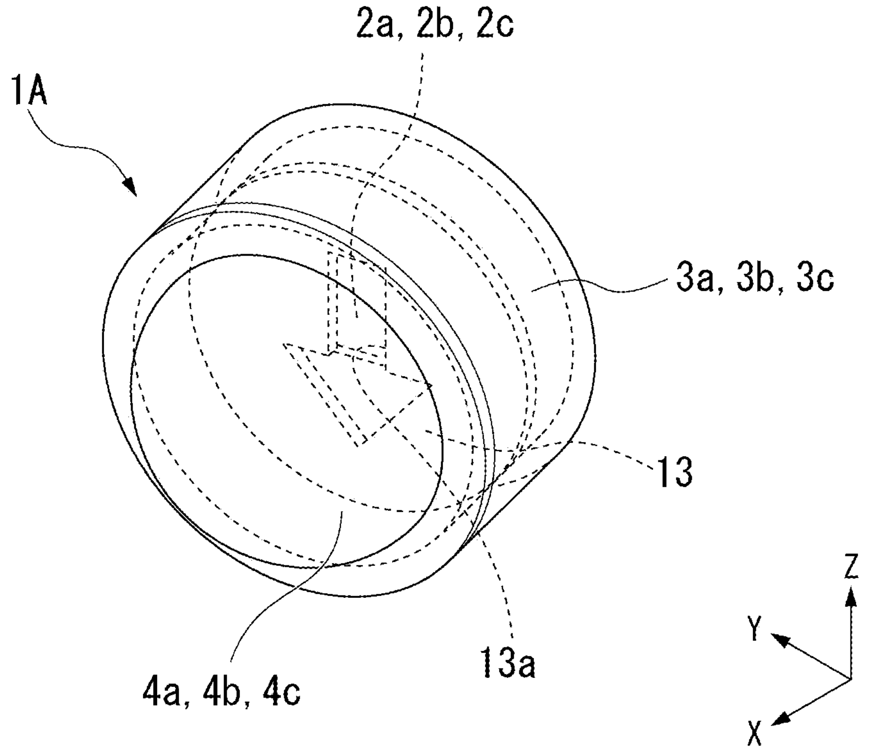
FIG. 7 is a perspective view showing another configuration of the light source unit for a vehicular lighting fixture shown in FIG. 2.

Further, FIG. 2 is a perspective view showing a configuration of the light source unit 1. FIG. 3 is a cross-sectional view showing a configuration of the light source unit 1. FIG. 4 is a perspective view showing a shape when a drawing pattern, which is obtained by reflecting a shape formed by emission of a plurality of light sources from the light source unit 1, is projected onto a road surface using a plurality of lens bodies. FIG. 5 is a plan view showing a shape when a drawing pattern obtained by reflecting a shape formed by emission of the plurality of light sources is projected onto a road surface using the plurality of lens bodies as a part of back lamps from the light source unit 1. FIG. 6 is a plan view showing a shape when a drawing pattern obtained by reflecting a shape formed by emission of the plurality of light sources is projected onto a road surface using the plurality of lens bodies as a part of turn lamps from the light source unit 1. FIG. 7 is a perspective view showing another configuration of a light source unit 1A.

As shown in FIG. 2 to FIG. 4, the light source unit 1 of the embodiment includes a plurality of (in the embodiment, three) light sources 2*a*, 2*b* and 2*c*, a plurality of (in the embodiment, three) lens bodies 3*a*, 3*b* and 3*c* disposed in front of the plurality of light sources 2*a*, 2*b* and 2*c*, respectively, a plurality of (in the embodiment, three) lens holding parts 4*a*, 4*b* and 4*c* configured to hold the lens bodies 3*a*, 3*b* and 3*c* in front of the light sources 2*a*, 2*b* and 2*c* while surrounding the light sources 2*a*, 2*b* and 2*c*, respectively, a circuit board 5 on which the plurality of light sources 2*a*, 2*b* and 2*c* are mounted, a heatsink 7 configured to radiate heat emitted from the plurality of light sources 2*a*, 2*b* and 2*c* to the outside via a board attachment part 6 to which the circuit board 5 is attached, and a socket body 9 configured integrally with the heatsink 7 and having a connector part 8 electrically connected to the circuit board 5.

The plurality of light sources 2*a*, 2*b* and 2*c* are constituted by light emitting diodes (LEDs) configured to emit white light (hereinafter referred to as “light”) L1, L2 and L3, respectively. The plurality of light sources 2*a*, 2*b* and 2*c* are mounted on one surface (in the embodiment, a front surface) side of the circuit board 5 on which a driving circuit (not shown) configured to drive the LEDs is provided, and are arranged at equal intervals in one direction (in the embodiment, the widthwise direction) in the surface of the circuit board 5. Accordingly, each of the light sources 2*a*, 2*b* and 2*c* radially emits the light L1, L2 and L3 forward (toward a +X axis).

The plurality of lens holding parts 4*a*, 4*b* and 4*c* are formed of, for example, a cylindrical white resin, and attached to one surface side of the circuit board 5 while surrounding the light sources 2*a*, 2*b* and 2*c*, respectively.

The plurality of lens bodies 3*a*, 3*b* and 3*c* are constituted by convex lenses obtained by adjusting focal distances such that rear focuses thereof coincide with the light sources 2*a*, 2*b* and 2*c* or the vicinity thereof, and attached to front sides of the lens holding parts 4*a*, 4*b* and 4*c*, respectively.

The plurality of lens bodies 3*a*, 3*b* and 3*c* are disposed for each of the light sources 2*a*, 2*b* and 2*c* arranged in one direction, respectively, in a state distances T1, T2 and T3 between the light sources 2*a*, 2*b* and 2*c* and the lens bodies 3*a*, 3*b* and 3*c* are different from each other for each of the light sources 2*a*, 2*b* and 2*c*. Specifically, in the embodiment, provided that a distance between the light source 2*a* and the lens body 3*a* located on one end side in one direction is set as T1, a distance between the light source 2*b* and the lens body 3*b* located in the middle of the one direction is set as T2 and a distance between the light source 2*c* and the lens body 3*c* located on the other end side in the one direction is set as T3, T1<T2<T3 is satisfied.

In addition, light gathering power of the plurality of lens bodies 3*a*, 3*b* and 3*c* is relatively higher as the distances T1, T2 and T3 to the light sources 2*a*, 2*b* and 2*c* from the plurality of lens bodies 3*a*, 3*b* and 3*c* become larger. That is, as the distances T1, T2 and T3 to the light sources 2*a*, 2*b* and 2*c* from the plurality of lens bodies 3*a*, 3*b* and 3*c* are increased, the lights L1, L2 and L3 emitted from the light sources 2*a*, 2*b* and 2*c* can be projected in a more forward.

The light source unit 1 has a structure in which the heatsink 7 and the socket body 9 are integrated by insert-molding the heatsink 7 and the socket body 9 together. Further, the light source unit 1 may have a structure in which the heatsink 7 and the socket body 9, which are formed separately, are integrated together with a screw or the like.

The heatsink 7 is formed of a metal material having high thermal conductivity, for example, aluminum (Al), iron (Fe), copper (Cu), or the like. The socket body 9 is formed of an insulating resin material, for example, polyethylene terephthalate (PET), polybutylene terephthalate (PBT), polyamide (PA), or the like. In addition, the socket body 9 may be made of resin to which a filler with high thermal conductivity, such as carbon, ceramic, metal, or the like, has been added.

The heatsink 7 has a substantially disk-shaped base part 7*a*, a protrusion part 7*b* protruding from a substantially central part of the base part 7*a* on a front surface side in a substantially rectangular cross-sectional shape, and a plurality of radiating fins 7*c* protruding from a rear surface side of the base part 7*a* in a longitudinal plate shape while being arranged in the widthwise direction.

The socket body 9 has a substantially disk-shaped base part 9*a*, a cylindrical wall part 9*b* protruding forward from a substantially central part of the base part 9*a* on a front surface side in a substantially circular cross-sectional shape, and a through-hole 9*c* formed in the cylindrical wall part 9*b* and passing through the base part 9*a* in the forward/rearward direction in a substantially rectangular cross-sectional shape.

In addition, the outer circumferential surface of the cylindrical wall part 9*b* is provided with a plurality of claw portions 9*d* arranged in a circumferential direction so as to act as anti-rotation and anti-fall-out members for the attachment hole 101*a* of the housing 101. The packing 104 is attached while passing through the cylindrical wall part 9*b* and being in contact with the base part 9*a*.

The socket body 9 has a through-hole 9*e* located below the through-hole 9*c* and passing through a cylindrical wall part 8*b* and the base part 9*a* in the forward/rearward direction, and a substantially rectangular cylindrical fitting portion 9*f* protruding rearward from a periphery of the through-hole 9*e* of the base part 9*a* on a back surface side.

The connector part 8 has a plurality of lead terminals 10. Each of the lead terminals 10 is integrally attached to the main body portion 8*a* while passing through a main body portion 8*a* of the connector part 8 in the forward/rearward direction. The connector part 8 is configured to fit the main body portion 8*a* into the through-hole 9*e* such that the lead terminals 10 are located inside the fitting portion 9*f*.

The plurality of lead terminals 10 is fixed to a land portion in the periphery of each of a plurality of hole portions 5*a* by soldering while passing through the hole portions 5*a* that pass through the circuit board 5 in a thickness direction. Accordingly, the plurality of lead terminals 10 are electrically connected to the circuit board 5.

The board attachment part 6 is provided on an inner front surface of the cylindrical wall part 9*b*. The heatsink 7 and the socket body 9 are integrated by fitting the protrusion part 7*b* into the through-hole 9*c* and butting the base parts 7*a* and 9*a* against each other. In addition, a sealing member 11 is disposed between a tip of the protrusion part 7*b* and the through-hole 9*c* to hermetically seal a space therebetween. Accordingly, in the board attachment part 6, the tip of the protrusion part 7*b* exposed from the through-hole 9*c* forms a flat surface continuous with the inner front surface of the cylindrical wall part 9*b*.

The circuit board 5 is attached to the front surface of the board attachment part 6 via thermally conductive adhesive 12. Accordingly, the circuit board 5 is thermally connected to the heatsink 7 via the protrusion part 7*b* that constitutes a part of the thermally conductive adhesive 12 and the board attachment part 6. Meanwhile, the circuit board 5 is electrically insulated from the heatsink 7 in this state.

In the light source unit 1 of the embodiment having the above-mentioned configuration, as shown in FIG. 4, drawing patterns P1, P2 and P3 by the lights L1, L2 and L3 emitted from the plurality of light sources 2*a*, 2*b* and 2*c* are projected next to each other toward a road surface T in front of the vehicle in the forward/rearward direction by the plurality of lens bodies 3*a*, 3*b* and 3*c*.

Here, by projecting light source images obtained by reflecting shapes of the light emitting surface of the light sources 2*a*, 2*b* and 2*c* toward the road surface T in front of the vehicle next to each other in the forward/rearward direction, the rectangular drawing patterns P1, P2 and P3 extending toward the side in front of the road surface T and having widths that are gradually increased are formed next to each other in the forward/rearward direction of the road surface T.

Further, since the distance projected from the plurality of light sources 2*a*, 2*b* and 2*c* to the road surface T is sufficiently larger than the interval between the plurality of adjacent light sources 2*a*, 2*b* and 2*c*, it is possible to almost ignore the center shift in the widthwise direction of the drawing patterns P1, P2 and P3 aligned in the forward/rearward directions of the road surface T.

Accordingly, in the vehicular lighting fixture 100 including the light source unit 1 of the embodiment, as shown in FIG. 5, as a part of back lamps mounted on both corner portions of a rear end side of a vehicle B, road surface drawing can be performed while projecting the plurality of drawing patterns P1, P2 and P3 toward the road surface T when the vehicle moves rearward.

As described above, in the light source unit 1 of the embodiment, by projecting the drawing patterns P1, P2 and P3 by the lights L1, L2 and L3 emitted from the plurality of light sources 2*a*, 2*b* and 2*c* toward the road surface T using the plurality of lens bodies 3*a*, 3*b* and 3*c*, utilization efficiency of the lights L1, L2 and L3 when road surface drawing is performed can be increased.

In addition, in the light source unit 1 of the embodiment, by projecting the drawing patterns P1, P2 and P3 obtained by reflecting the shape formed by emission of the plurality of light sources 2*a*, 2*b* and 2*c* toward the road surface T, utilization efficiency of the lights L1, L2 and L3 can be further increased.

In addition, in the light source unit 1 of the embodiment, as light gathering power of the lens bodies 3*a*, 3*b* and 3*c* becomes relatively higher as the distances T1, T2 and T3 to the light sources 2*a*, 2*b* and 2*c* from the lens bodies 3*a*, 3*b* and 3*c* are increased, brightness (illuminance) of the drawing patterns P1, P2 and P3 can be made uniform regardless of the distance where the light is projected toward the road surface T from the plurality of light sources 2*a*, 2*b* and 2*c*.

Further, the present invention is not necessarily limited to the embodiment and various modifications may be made without departing from the scope of the present invention.

For example, in the above-mentioned embodiment, as a part of the back lamps, while the case in which road surface drawing is performed while projecting the plurality of drawing patterns P1, P2 and P3 toward the road surface T when the vehicle moves rearward has been exemplified, for example, as shown in FIG. 6, as a part of turn lamps mounted on both corner portions on a front end side of the vehicle B, road surface drawing can also be performed by projecting the drawing patterns P1, P2 and P3 by orange lights L1, L2 and L3 emitted from the plurality of light sources 2*a*, 2*b* and 2*c* toward the road surface T next to each other in the forward/rearward direction using the plurality of lens bodies 3*a*, 3*b* and 3*c*.

Accordingly, for example, in a scenario in which vehicle B is involved in an accident when turning at an intersection, when the turn lamp is turned on, the plurality of drawing patterns P1, P2 and P3 projected onto the road surface T can alert motorcycles, pedestrians, and the like, in the blind spot of the vehicle B that vehicle B is going to turn.

In addition, in the light source unit 1, while the drawing patterns P1, P2 and P3 obtained by reflecting the shape formed by emission of the plurality of light sources 2*a*, 2*b* and 2*c* are projected toward the road surface T, for example, like the light source unit 1A shown in FIG. 7, it is possible to provide a configuration in which a filter 13 having a transmissive area (in the embodiment, a slit) 13*a* through which the lights L1, L2 and L3 emitted from the light sources 2*a*, 2*b* and 2*c* pass is disposed between the light sources 2*a*, 2*b* and 2*c* and the lens bodies 3*a*, 3*b* and 3*c*, and the drawing patterns P1, P2 and P3 obtained by reflecting a shape (in the embodiment, an arrow) of the transmissive area 13*a* are projected toward the road surface T.

In the case of the configuration, although light other than the lights L1, L2 and L3 that pass through the transmissive area 12*a* is blocked by the filter 13, since the transmissive area 13*a* of the filter 13 is located in close proximity to the light sources 2*a*, 2*b* and 2*c*, it is possible to improve the utilization efficiency of the lights L1, L2 and L3 when road surface drawing is performed more than in the related art.

In addition, in the light source unit 1, it is also possible to control the directions of the lights L1, L2 and L3 projected toward the road surface T by tilting the central axis of each of the lens bodies 3*a*, 3*b* and 3*c* relative to the optical axes of the lights L1, L2 and L3 emitted from the light sources 2*a*, 2*b* and 2*c* described above, or by providing a refraction surface on the rear surface side of each of the lens bodies 3*a*, 3*b* and 3*c*.

REFERENCE SIGNS LIST

1, 1A Light source unit for a vehicular lighting fixture
2*a*, 2*b*, 2*c* Light source
3*a*, 3*b*, 3*c* Lens body
4*a*, 4*b*, 4*c* Lens holding part
5 Circuit board
6 Board attachment part
7 Heatsink
8 Connector part
9 Socket body
10 Lead terminal
11 Sealing member
12 Thermally conductive adhesive
13 Filter
L1, L2, L3 Light
P1, P2, P3 Drawing pattern
100 Vehicular lighting fixture
101 Housing
102 Lens cover
103 Lighting body
104 Packing

The invention claimed is:

1. A light source unit for a vehicular lighting fixture comprising:
- a plurality of light sources;
- a plurality of lens bodies disposed in front of the plurality of light sources, respectively;
- a circuit board on which the plurality of light sources are mounted;
- a heatsink configured to radiate heat emitted from the plurality of light sources to outside via a board attachment part to which the circuit board is attached; and
- a socket body configured integrally with the heatsink and having a connector part electrically connected to the circuit board,
- wherein the plurality of light sources are arranged in one direction in a surface of the circuit board,
- the plurality of lens bodies are disposed for each of the light sources aligned in the one direction, respectively, in a state distances between the light sources and the lens bodies are different from each other for each of the light sources, and
- wherein drawing patterns formed by emission of the plurality of light sources are projected toward a road surface in a forward/rearward direction by the plurality of lens bodies.

2. The light source unit for a vehicular lighting fixture according to claim 1, wherein the drawing patterns obtained by reflecting shapes formed by emission of the light sources are projected toward a road surface.

3. The light source unit for a vehicular lighting fixture according to claim 1, wherein light gathering power of the plurality of lens bodies becomes relatively higher as the distance between the lens bodies and the light source becomes larger.

4. The light source unit for a vehicular lighting fixture according to claim 1, comprising a lens holding part configured to hold the lens body in front of the light source while surrounding the light source.

5. A vehicular lighting fixture comprising:

the light source unit according to claim 1, a housing in which one side has an opening, and a transparent lens cover covering the opening of the housing, wherein the light source unit is detachably attached in a state in which one side of the light source unit is inserted inside of the vehicular lighting fixture from an attachment hole provided in another side of the housing, as an exchangeable coupler socket.

6. The vehicular lighting fixture according claim 5, wherein, as a part of back lamps, the light source unit projects the drawing patterns toward the road surface when the vehicle moves rearward.

7. The vehicular lighting fixture according claim 5, wherein, as a part of turn lamps, the light source unit projects the drawing patterns.

8. A road surface projecting light source unit comprising:

a plurality of light sources;

a plurality of lens bodies disposed in front of the plurality of light sources, respectively;

a circuit board on which the plurality of light sources are mounted;

a heatsink configured to radiate heat emitted from the plurality of light sources to outside via a board attachment part to which the circuit board is attached;

a socket body configured integrally with the heatsink and having a connector part electrically connected to the circuit board; and a filter that is disposed between at least one of the light sources and the lens bodies and that has a transmissive area through which light emitted from the light sources passes, wherein drawing patterns, which includes drawing patterns obtained by reflecting a shape of the transmissive area, formed by emission of the plurality of light sources are projected toward a road surface by the plurality of lens bodies.

* * * * *